United States Patent [19]

Block et al.

[11] 3,981,779

[45] Sept. 21, 1976

[54] INHIBITION OF SCALE ON SALINE WATER HEAT EXCHANGE SURFACES WITH IMINODIACETIC ACID COMPOUNDS

[75] Inventors: Jacob Block, Rockville; Nelson Samuel Marans, Silver Spring, both of Md.

[73] Assignee: W. R. Grace & Co., Cambridge, Mass.

[22] Filed: Aug. 1, 1974

[21] Appl. No.: 493,959

Related U.S. Application Data

[62] Division of Ser. No. 312,343, Dec. 5, 1972, abandoned.

[52] U.S. Cl. ............................ 203/7; 159/DIG. 13; 203/DIG. 17; 210/58; 252/82; 252/180; 252/394; 260/429 J; 260/534 E
[51] Int. Cl.² ................... B01D 3/34; C23F 11/00; C23F 14/00
[58] Field of Search ........ 203/7, 6, 38, 59, DIG. 17; 252/80, 175, 180, 181, 83–85; 159/DIG. 13; 210/57, 58; 260/429 J, 534 E

[56] References Cited
UNITED STATES PATENTS

| | | | |
|---|---|---|---|
| 2,926,108 | 2/1960 | Anderson | 260/534 E |
| 3,116,105 | 12/1963 | Kerst | 252/180 |
| 3,430,641 | 3/1969 | Newman | 260/534 E |
| 3,630,927 | 12/1971 | Shen | 260/534 E |

*Primary Examiner*—Frank W. Lutter
*Assistant Examiner*—Frank Sever
*Attorney, Agent, or Firm*—Armand McMillan; C. E. Parker

[57] ABSTRACT

A method for decreasing fouling of metalliferous surfaces of apparatus wherein water is evaporated from an aqueous system containing components which deposit onto the surfaces as hydrophilic foulants. The method comprises adding to the aqueous system a chelant-surfactant having a hydrophobic moiety and a chelating moiety through which the chelant-surfactant chelates with the metalliferous surfaces and provides a hydrophobic barrier to deposition of hydrophilic foulants.

2 Claims, No Drawings

INHIBITION OF SCALE ON SALINE WATER HEAT EXCHANGE SURFACES WITH IMINODIACETIC ACID COMPOUNDS

This is a division, of application Ser. No. 312,343 filed Dec. 5, 1972 now abandoned.

BACKGROUND OF THE INVENTION

Metals and alloys are well known materials of construction for apparatus wherein aqueous systems may be concentrated, as by evaporation of water from the system. It is also well known that scale and other hydrophilic foulants deposit onto metal containing and alloy containing surfaces of such apparatus where aqueous systems such as saline water are subjected to evaporation and related processes in the apparatus. These deposits typically reduce heat transfer rates, resulting in substantial inefficiency of the processes such as increased heating media requirements and frequent cleanings.

Typically, the apparatus surfaces include such metals as copper, nickel, and alloys thereof. Alloys comprising copper and nickel are widely used in these surfaces. Such alloys are well known, e.g., Monel which consists essentially of 66 percent nickel, 31.5 percent copper, and minor amounts of manganese iron, carbon, sulfur, and silica.

Various method for removing salt from sea water have been developed over the years to relieve the scarcity of fresh water in many parts of the world. In addition, the ships at sea have been utilizing sea water as a source of drinking water for some time. One of the principal methods of purifying sea water is through the use of various types of evaporators such as flash evaporators, thin film distillation evaporators and submerged tube evaporators. Surfaces of many of these evaporators are formed of copper-nickel alloys.

Sea water contains a substantial amount of components which deposit onto metal containing and alloy containing surfaces as scale and related hydrophilic foulants. The alkaline scales, including calcium carbonate and magnesium hydroxide, are particularly troublesome in sea water evaporators. These scales form readily on surfaces of copper, nickel, and copper-nickel alloys.

In a number of methods heretofore proposed for decreasing deposition of scale from aqueous systems onto metalliferous surfaces of apparatus such as sea water distillation plants, chelating agents specific for chelating scale-forming metals included in the aqueous systems are added, as with the aqueous feed.

One of the methods proposed for inhibiting deposition of alkaline scale onto metal or alloy surfaces of sea water evaporators and related apparatus is treatment of the feed with sulfuric acid. This method has not proved entirely satisfactory in that it requires a high degree of technical sophistication on the part of the operators which may not be available in certain underdeveloped countries. In addition, handling and storing of large quantities of sulfuric acid poses some problems.

Addition of polyphophate-lignosulfonate mixtures has been proposed for inhibiting alkaline scale depositions, as for example in U.S. Pat. No. 2,782,162 to Lidell. However, these mixtures have not proved effective in saline water systems at high temperatures, addition thereof typically resulting in formation of calcium phosphate sludge at system temperatures above 195°F.

Certain polyelectrolytes such as sodium polymethacrylate, while generally effective in preventing calcium carbonate scale at temperatures as high as 240°F., have not proved entirely satisfactory in aqueous systems from which, when concentrated as in sea water evaporators, magnesium including foulants typically are deposited. For example, sodium polymethacrylate is generally ineffective for inhibiting magnesium hydroxide scale deposition from saline water concentrated to 70,000 parts per million total dissolved solids at system temperatures at which sea water distillation plants typically are operated.

BRIEF DESCRIPTION OF THE INVENTION

It has now been found by practice of the present invention that chelant-surfactants having hydrophobic and chelating moieties may be used to decrease fouling of metal-containing or alloy-containing surfaces of apparatus wherein water is evaporated from aqueous systems containing one or more components which deposit onto the surfaces as hydrophilic foulants.

When used in accordance with this invention, such chelant-surfactants are believed to chelate with the metal or alloy-containing surfaces through chelating moieties thereof and provide a hydrophobic barrier which aids in decreasing deposition of scale and similar hydrophilic deposits.

Chelant-surfactants effective in the present invention include N-lauryliminodiacetic acid, N-oleyliminodiacetic acid, N-oleoyliminodiacetic acid, alkali metal salts of said acids, ammonium salts of said acids, and the like.

DETAILED DESCRIPTION OF THE INVENTION

Chelant-surfactants having hydrophobic and chelating moieties may be used, in accordance with the present invention, for decreasing fouling of metal-containing or alloy-containing surfaces of a wide variety of apparatus wherein water is evaporated from aqueous systems containing components which deposit onto the surfaces as hydrophilic foulants. Processes which may benefit from this invention include water evaporation processes which typically are carried out using apparatus including black liquor evaporators, sugar evaporators, cooling towers, radioactive waste concentrators, process evaporators, sea water evaporators, and the like.

Chelant-surfactants suitable herein include compounds having the following general formula:

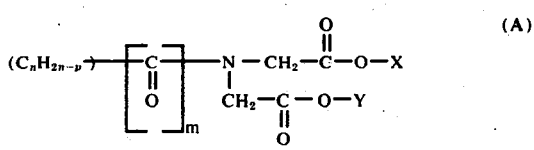

(A)

wherein $n$ is an integer from about 8 to about 18, $p$ is minus one, 1, 3, or 5, $m$ is zero or one, and X and Y are selected from the group consisting of hydrogen atom, ammonium radical, and monovalent metals other than monovalent metals which form ammine or ammonia complexes.

Other suitable chelant-surfactants include compounds having the following general formula:

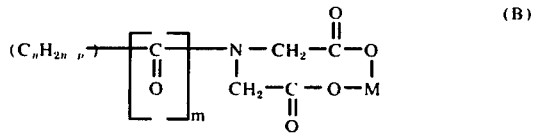

wherein $n$ is an integer from about 8 to about 18, $p$ is minus one, 1, 3, or 5, $m$ is zero or one, and M is a divalent metal other than divalent metals which form ammine or ammonia complexes.

The metals in the formulas A and B above may be, for example, magnesium, calcium, barium, strontium, iron II, manganese II, mercury, cobalt II, zinc, copper I, and nickel, provided that the stability constant of the least stable metal in the metal or alloy surface of the apparatus is not less than the stability constant of the metal included in the chelant-surfactant. The relative stability constants referred to in the immediately preceding description are the stability constants for those metals when chelated by the chelant-surfactant for the metalliferous apparatus as the metals defined above by X, Y, and M respectively.

Chelant-surfactants effective in the present invention include N-lauryliminodiacetic acid, N-oleyliminodiacetic acid, N-oleoyliminodiacetic acid, suitable metal salts of said acids, ammonium salts of said acids, and the like. The stability constants for copper and nickel with these acids are about 8 to 9 and about 10–11, respectively. Suitable metal salts of these acids for utilization of the present method for decreasing fouling of metalliferous surfaces containing copper, nickel, or copper-nickel alloys (e.g., Monel) include salts thereof containing the following metals having the indicated stability constants with the acids: magnesium (2.94), calcium (2.95), and barium (1.67). Other suitable metals include strontium, iron, manganese II, mercury, cobalt II, zinc, copper I, and nickel, all of which have suitably low stability constants with these acids.

The invention provides a method for decreasing fouling of the metalliferous surfaces of apparatus of the type described above which comprises adding to the aqueous system a chelant-surfactant having a hydrophobic moiety and a chelating moiety through which the chelant surfactant chelates with the metal-containing or alloy-containing surface. The chelant-surfactant per se may be added to the system or it may be initially mixed with a suitable liquid, e.g., water, followed by adding the liquid mix to the system. The addition may be made in any effective amount, for example, from about 1 to about 100 parts by weight of the chelant-surfactant per million parts by weight of the aqueous system.

An efficient manner of practicing the present invention includes initially adding the chelant-surfactant in a relatively high amount, for example, about 100 parts per million for a suitable period of time during which the chelant-surfactant may form a film on the metal or alloy surface, and thereafter decreasing the addition to a relatively minor rate, e.g., from about 1 to about 10 parts per million. Continuing additions may be in minor amounts and apparently serve to replace any film which may have been removed as by action of the process being carried out.

The present method is especially effective for decreasing deposition of hydrophilic foulants as, for example, scale in sea water distillation plants. The pH and composition of sea water vary depending on the source. In general, the pH of sea water is in the range of from about 7.5 to about 8.2. An average sea water has the following analysis in parts per million:

| | |
|---|---:|
| Calcium | 410 |
| Magnesium | 1,300 |
| Sodium | 10,800 |
| Potassium | 300 |
| Chloride | 19,450 |
| Sulfate | 2,700 |
| Total Alkalinity | 90 – 150 |
| Total Solids | 35,165 |

It is obvious from this analysis that sea water includes substantial amounts of calcium and magnesium. Scales of, for example, calcium carbonate and magnesium hydroxide typically form on the metalliferous surfaces of sea water evaporators. These scales are found to form at unacceptably fast rates on copper, nickel and copper-nickel alloy surfaces.

In accordance with the present invention, chelant-surfactants including N-lauryliminodiacetic acid, N-oleyliminodiacetic acid, N-oleoyliminodiacetic acid, and ammonium and suitable metal salts thereof have been found superior for inhibiting scale deposition on copper-nickel alloy surfaces of apparatus used in sea water evaporation processes. These surfactants may be added as above described and in any suitable amounts. Additions of from about 1 to about 25 parts by weight of these chelant-surfactants per million parts by weight of sea water are especially effective. High amounts may be used, but the additional effectiveness is generally insufficient to justify the added cost thereof.

While it is not intended to be bound by theory, it is believed that the hydrophobic moieties of the surface chelated chelant-surfactants act in effect as a film on the surface to repel hydrophilic scale-forming precipitates.

While deposition of numerous scales may effectively be decreased in accordance with this invention the method is especially effective for decreasing deposition of magnesium-containing deposits from aqueous systems comprising deposit forming amounts of magnesium salts. Deposition of magnesium hydroxide foulants is especially minimized using this method.

Decreased fouling of heat exchange surfaces especially results from the method of this invention.

The present invention will be further illustrated by the following non-limiting examples. All parts and percentages given throughout this disclosure are by weight unless otherwise indicated.

EXAMPLE 1

This example illustrates fouling of an alloy-containing surface of apparatus wherein water is evaporated from an aqueous system containing a component which deposits onto the surface as a hydrophilic foulant.

A work bath was prepared by adding 700 milliliters (ml.) of natural sea water including 150 parts per million total alkalinity to a 1000 ml. beaker. A 2 inch square coupon of a copper-nickel alloy containing 90 percent copper and 10 percent nickel was preconditioned by contacting the coupon with another bath of similar sea water at a temperature of about 60°C. to 70°C. for a period of about 12 to 20 hours, and thereafter the coupon was immersed in the sea water work bath. The beaker was placed in a pressure cooker containing 4 liters of 455 grams lithium chloride solution per liter wherein the work bath was boiled at a pressure of about 29.7 pounds per square inch absolute and at a temperature of about 121°C. for about 45 minutes, after which time the coupon was removed and examined microscopically and chemically for scale content.

Microscopic analysis showed that the coupon was heavily fouled substantially throughout its surface.

Chemical analysis showed that the coupon was fouled with 3.2 milligrams of magnesium hydroxide scale, expressed in terms of the equivalent weight of calcium carbonate, i.e., the actual observed weight of magnesium hydroxide scale divided by 0.583.

EXAMPLES 2 TO 10

The procedure of Example 1 was repeated 9 times with natural sea water of substantially the same composition as the sea water used in that Example.

After removal from the various boiled work baths, microscopic analyses showed that all these copper-nickel alloy coupons were heavily fouled substantially throughout their surfaces.

Chemical analyses showed that these coupons were fouled with magnesium hydroxide in the following amounts, expressed in milligrams of the equivalent weights of calcium carbonate:

| | | | | |
|---|---|---|---|---|
| 4.1 | 3.1 | 3.8 | 3.6 | 3.7 |
| 4.2 | 3.8 | 3.6 | 4.3 | |

The mean value of the amount of magnesium hydroxide foulant deposited on the copper-nickel coupons for Examples 1 to 10 was calculated to be 3.7 milligrams, expressed in terms of the equivalent weight of calcium carbonate.

Examples 11 to 19 which follow illustrate the method of the present invention for decreasing fouling of an alloy-containing surface of apparatus wherein water is evaporated from an aqueous system containing a component which deposits onto the surface as a hydrophilic foulant.

EXAMPLES 11 TO 18

The procedure of the foregoing examples was repeated except that prior to boiling the various sea water work baths with the alloy coupons immersed therein, N-lauryliminodiacetic acid was added to the solutions in the approximate amounts indicated below, expressed in parts by weight of N-lauryliminodiacetic acid per million parts by weight of sea water (ppm). After removal from the boiled N-lauryliminodiacetic acid containing sea water, microscopic analyses of the coupons of these examples showed substantially less foulant deposition relative to the average amount of foulant observed for the coupons of Examples 1 to 10.

Chemical analyses showed that the coupons of these examples were fouled with magnesium hydroxide scale in the approximate amounts indicated below, expressed in milligrams of equivalent weight of calcium carbonate:

| Example No. | N-lauryliminodiacetic acid added, ppm. | Mg(OH)$_2$ scale mg. as CaCO$_3$ |
|---|---|---|
| 11 | 1.5 | 3.0 |
| 12 | 1.5 | 2.4 |
| 13 | 2.1 | 2.9 |
| 14 | 2.4 | 2.0 |
| 15 | 2.6 | 2.9 |
| 16 | 2.8 | 2.5 |
| 17 | 3.0 | 3.0 |
| 18 | 3.0 | 2.0 |

The data show that, in general, substantially less magnesium hydroxide scale was deposited onto the coupons immersed in the boiled N-lauryliminodiacetic acid containing sea water of Examples 11 to 18, relative to the average amount of magnesium hydroxide scale deposited on the coupons of Examples 1 to 10. The mean value of the amount of magnesium hydroxide foulant deposited on the coupons of Examples 11 to 18 was calculated to be 2.6 milligrams, expressed in terms of the equivalent weight of calcium carbonate, indicating that an average decrease in magnesium hydroxide scale of about 30 percent was effected by addition of N-lauryliminodiacetic acid as chelant-surfactant in the ppm range of these examples.

EXAMPLE 19

The procedure of Example 1 was repeated except that prior to boiling the sea water work bath with the alloy coupon immersed therein, approximately 3 parts of N-oleoyliminodiacetic acid was added per million parts of sea water. After removal from the boiled N-oleoyliminodiacetic acid containing sea water, microscopic analysis of the coupon showed substantially less foulant deposition relative to the average amount of foulant observed for the coupons of Examples 1 to 10.

Chemical analysis showed that the coupon of this example was fouled with 2.8 milligrams of magnesium hydroxide scale, expressed in milligrams of equivalent weight of calcium carbonate.

The data show that substantially less magnesium hydroxide scale was deposited onto the coupon immersed in the boiled N-oleoyliminodiacetic acid containing sea water of this example, relative to the average amount of magnesium hydroxide scale deposited on the coupons of Examples 1 to 10.

It is to be understood that the foregoing detailed description is given merely by way of illustration and that various modifications may be made therein without departing from the spirit or scope of the present invention.

What is claimed is:

1. A method for inhibiting the deposition of scale on heat exchange surfaces of saline water distillation plants which comprises adding 1 to 25 parts per million of a chelant surfactant selected from the group consisting of salts, N-oleyiminodiacetic acid, its alkali metal and ammonium salts, N-oleoyliminodiacetic acid and its alkali metal and ammonium salts.

2. A method for inhibiting the deposition of scale on heat exchange surfaces of saline water distillation plants which comprises adding 1 to 25 parts per million of a compound selected from the group consisting of the magnesium, calcium, barium, iron II, Manganese II, mercury, cobalt II, zinc and nickel chelates of N-oleyliminodiacetic acid; the magnesium calcium, barium, iron II, Manganese II, mercury, cobalt II, zinc and nickel chelates of N-oleoyliminodiacetic acid.

* * * * *